3,759,733
PIGMENT COMPOSITIONS
Gordon Frank Bradley, Paisley, David Price, Beith, and Alexander Hamilton, Giffnock, Scotland, assignors to Ciba-Geigy AG, Basel, Switzerland
No Drawing. Filed July 14, 1971, Ser. No. 162,632
Claims priority, application Great Britain, July 16, 1970, 34,427/70
Int. Cl. C09b 29/00, 31/00
U.S. Cl. 106—309                                17 Claims

ABSTRACT OF THE DISCLOSURE

A process in which a monoazo pigment composition is produced which comprises coupling a diazotised pigment aniline or a diazotised substituted pigment aniline with a pigment coupling agent and incorporating in the pigment a water-soluble azo dyestuff.

---

In our copending application No. 141,004 we describe how to prepare modified diarylide pigments which have better colour strength and transparency properties than conventional diarylide pigments when incorporated in printing inks, and we say that we do this by coupling a tetrazotised pigment benzidine with a pigment coupling agent and incorporating in the pigment a water-soluble coupled diarylide dyestuff. We use the terms pigment benzidine and pigment coupling agent merely to differentiate the compounds forming the pigment from the compounds which are used to form the dyestuff.

We have now found that the principle of incorporating a diarylide dyestuff into a diarylide pigment may be extended to arylamide yellow pigments, β-naphthol red pigments and arylamide red pigments. According to this invention, we prepare arylamide yellow pigments by coupling a diazotised pigment aniline or a diazotised substituted pigment aniline with a pigment acetoacetarylamide coupling agent, and we incorporate in the pigment a water soluble coupled dyestuff, preferably an arylamide dyestuff, and similarly we prepare β-naphthol red pigments or arylamide red pigments by coupling a diazotised pigment aniline or a diazotised substituted pigment aniline with pigment β-naphthol or with a substituted pigment β-naphthol or with a pigment 2-hydroxynaphthalene-2-carboxylic acid arylamide coupling agent and incorporating in the pigment a water soluble azo dyestuff. Once again the prefix "pigment" qualifying the diazo component or the coupling agent is used merely to differentiate the compounds forming the pigment from the compounds forming the dyestuff.

As indicated above, the so-called arylamide yellows are azo compounds prepared by coupling a diazotised aniline or substituted aniline with an acetoacetarylamide. Exampels of important reds in these categories are:

| Colour index name | Diazo component | Coupling agent |
|---|---|---|
| No. 11680 Pigment Yellow 1 (Yellow G). | 3-nitro 4 amino toluene | Acetoacetanilide. |
| No. 11665 Pigment Yellow 4 (Yellow 5G). | 4-nitroaniline | Do. |
| No. 11710 Pigment Yellow 3 (Yellow 10G). | 4-chloro 2 nitro aniline | Acetoacet-ortho-chloranilide. |

When conventional arylamide yellows are dispersed in decorative paint media at an elevated temperature, for example 70° C., using a high speed stirrer-dissolver, it is found that the product has considerably lower colour strength than similar products in which the same pigment has been carefully dispersed at room temperature. As much as 30% of tinctorial strength can be lost in this way, and since most industrial dispersers generate heat in the materials they are processing, loss of tinctorial strength can be a serious problem. We have now found that the incorporation of a soluble dyestuff in an arylamide yellow, as in our invention, can result in a pigment composition which is not so subject to this loss of tinctorial strength. In addition, it is found that arylamide yellow pigment compositions prepared according to the invention have better flow properties when incorporated into decorative paint media than conventional arylamide yellows.

The so-called β-naphthol reds and arylamide reds are azo compounds prepared by coupling a diazotised aniline or substituted aniline wtih a β-naphthol or with an arylamide of 2-hydroxy-naphthalene-3-carboxylic acid. Examples of important reds in these categories are:

| Colour index No. and name | Diazo component | Coupling agent |
|---|---|---|
| No. 12120 Pigment Red 3. | 3-nitro-4 amino toluene. | 2-naphthol. |
|  | 4-nitro-2-amino toluene. | 2-methylanilide of 2-hydroxy-naphthalene-3-carboxylic acid. |
| No. 12460 Pigment Red 9. | 2.5 dichloraniline | 2-methoxyanilide of 2-hydroxy-naphthalene-3-carboxylic acid. |
| No. 12420 Pigment Red 7. | 5-chloro-2-amino toluene. | 2-methyl-4-chloranilide of 2-hydroxy-naphthalene-3-carboxylic acid. |
| No. 12385 Pigment Red 12. | ----do------- | 2-methyl anilide of 2-hydroxy-naphthalene-3-carboxylic acid. |

As in the case of arylamide yellows, previously discussed, it is found that β-naphthol red and arylamide red pigment compositions prepared according to the invention have better flow properties when incorporated into decorative paint media than do conventional red pigments of these types.

The incorporation of the dyestuff may be carried out in a number of ways: in one process, we use a stoichiometric excess of the pigment coupling agent over the diazotised pigment aniline, and we add a minor proportion of one or more diazotised anilines bearing water-solubilising groups to the diazotised pigment aniline before the coupling, or to a portion of the pigment coupling agent before the coupling or to the reaction mixture during or after the coupling.

In another process, we use a stoichiometric excess of the diazotised pigment aniline over the pigment coupling agent, and add a minor proportion of one or more coupling agents containing water-solubilising functional groups to the pigment coupling agent before the coupling, or to a portion of the diazotised pigment aniline before the coupling or to the reaction mixture during or after the coupling.

The desired modification of the properties of pigments may also be achieved, according to the invention, by adding one or more soluble dyestuffs to the diazotised pigment aniline before the coupling or to a portion of the pigment coupling agent before the coupling or to the reaction mixture during or after the coupling, or to the previously prepared pigment, or by conducting the coupling of the pigment in a solution of such a soluble dyestuff. In such cases, the coupling agent of the dyestuff need not be the same as the coupling agent in the pigment itself, nor need the respective diazotised anilines be the same; indeed the dyestuff need not in fact have a similar structure to that of the pigment it is being used to modify.

The soluble dyestuff may be prepared by coupling a suitably water-solubilised aniline or substituted aniline with a coupling agent not containing water-solubilising groups, or by coupling a diazotised aniline or substituted aniline with a coupling agent containing water-solubilising groups, or by coupling a diazotised aniline or substituted aniline and a coupling agent both of which contain water-solubilising groups. By water-solubilising groups we mean groups such as sulphonic acid and carboxylic acid groups and water-soluble metal salts thereof, amino groups and water-soluble salts of amino groups, for example those formed with acids. The free acids of the acid dyestuffs may be obtained, for example, by boiling solutions of the sodium salts of the dyestuffs obtained in the coupling reactions in hydrochloric acid. Examples of dyestuffs which can be incorporated in arylamide yellows according to this invention are:

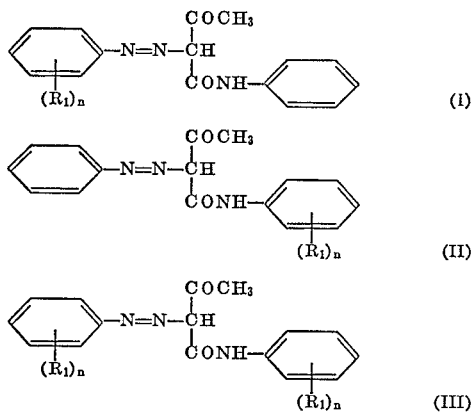

where $R_1$ is $SO_3H$, COOH or $NH_2$, $n$ is 1 or 2, and there may be additional alkyl, alkoxy, chloro or nitro groups on one or both aromatic rings. Similarly, examples of dyestuffs which may be incorporated into β-naphthol reds or arylamide reds are

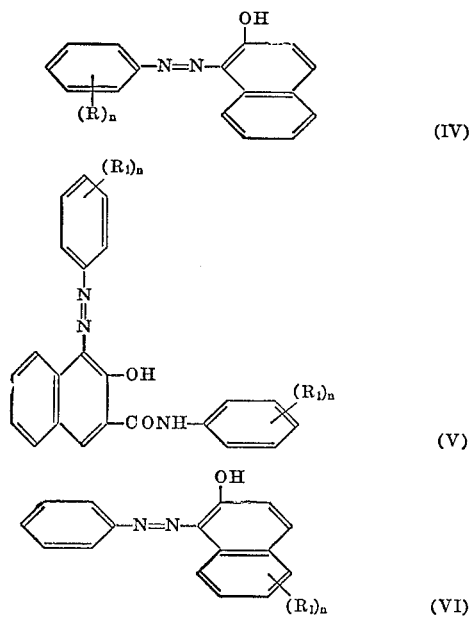

where $R_1$ and $n$ have the same meaning as in Formula I, II and III and any of the rings may carry further substituents such as alkyl, alkoxy, chloro or nitro groups.

Dyestuffs may be used which are of markedly different molecular or steric structure to the pigments into which they are to be incorporated; it is preferred however that the structures of pigment and dyestuff be essentially similar. The proportion of dyestuff in the pigment composition will normally be from 0.1 to 20% of the weight of the total pigment composition. If desired, the adsorbed soluble dyestuff may be rendered insoluble at a later stage in the preparation of the pigment, for example by the formation of insoluble salts of metals of Groups I–A, I–B, II–A, II–B, III–A, III–B and VIII of the Periodic Table. One very suitable way of forming the insoluble salts is by a double decomposition reaction between the sodium salt of the dyestuff and a water-soluble salt of the selected metal at an alkaline pH such as 8–9; typical soluble metal salts are zinc sulphate, magnesium sulphate, barium chloride, aluminium sulphate and calcium chloride. It may be desirable for the soluble dyestuff component in the pigment to be insolubilised in this way if there is a danger of the dyestuff being bled off during the washing stage of the preparation of the treated pigment or of the dyestuff bleeding into paint media. The retention of the dye in the final pigment composition as a water-insoluble metal salt also gives the pigment further advantages.

The process according to the invention may advantageously be combined with treatment of the pigment with conventional additives.

Among the additives which may advantageously be incorporated into the pigment composition are aliphatic amines or amine oxides; treatment of pigment produced according to the invention results in products which are heat-stable, and are easy to disperse in decorative paint media. The amines and amine oxides of particular value contain from 8 to 20 carbon atoms, and will generally be used in proportions of from 0.1 to 35% calculated on the weight of pigment plus dyestuff. Examples of amines which may be used are mixtures of primary amines such as that sold under the trademark Armeen T, resin amines, such as that sold under the trademark Rosin Amine, D, N-long chain alkyl alkylene diamines such as those sold under the trademark Duomeen, polyamines such as N-cocotrimethylene diamine - N'-propylamine, polyamide/polyamine derivatives such as those sold under the trademark Merginamide, β-amines such as those sold under the trademarks Armeen L11 and L15, ethoxylated fatty amines and diamines such as those sold under the trademarks Ethomeen and Ethoduomeen and derivatives of these compounds.

Another conventional treatment of pigments is known as solvent treatment. Processes generally involve the treatment of an aqueous paste or aqueous suspension of the pigment with a water-insoluble organic solvent, the treatment most frequently comprising boiling the paste or suspension and solvent, and then filtering off the pigment. Examples of solvents which may be used are aromatic hydrocarbons, chlorinated hydrocarbons, esters, ethers, nitro-compounds, nitriles and heterocyclic compounds. Specific examples of suitable solvents are tetralin, dibenzyl ether, and o-dichlorobenzene. Solvent treatment of pigment produced according to the invention results in products which are heat stable and which have better flow properties than untreated pigments.

Other conventional treatments of pigments involve the use of surfactants, or of rosin, resins and their derivatives. Of particular value in this case is the treatment of pigment composition produced according to the invention with non-ionic surfactants, such as the ethylene oxide/fatty alcohol condensate sold under the trademark Lubrol W. Examples of rosin, resins and derivatives are impure mixtures of materials having the abietic acid skeleton such as WW Gum Rosin, and those sold under the trademarks Staybelite Resin and Dymerex Resin, and rosin-modified phenolic resins sold under the trademark Beckacite. Treatment of pigment produced according to the invention with resins improves the dispersibility of the product.

Some examples will now be given, all parts and proportions being by weight unless otherwise stated.

EXAMPLE 1

An aqueous slurry of arylamide yellow 10G pigment was prepared by coupling a diazo solution prepared from 41.0 parts of p-chloro-o-nitronailine with a mixed coupling agent consisting of 44.2 parts, acetoacet-o-chloranilide and 6.2 parts acetoacet-o-anisidide, using sodium acetate as a buffer. An aqueous solution containing 2.7 parts acetoacet-o-chloranilide and 0.6 parts sodium hydroxide was then added followed by a diazo solution prepared from 3.14 parts aniline-2:5-disulphonic acid. When coupling was complete the slurry was neutralised with caustic soda and an aqueous solution containing 4.5 parts of 3-octadecylaminopropylamine sold under the Trademark Duomeen T and 1.5 parts acetic acid was added. The slurry was heated to 70° C., and the pigment was separated by filtration, washed free of water-soluble impurities and dried.

When dispersed in a decorative paint medium at elevated temperature of 70° C. using a high speed stirrer-dissolver, the pigment composition showed no less in colour strength when compared with a dispersion carefully prepared at low temperature. A pigment prepared in an exactly similar manner, except that the incorporation of dyestuff was omitted, showed a loss of 30% in colour strength under similar conditions and also gave a paint of much poorer flow properties.

EXAMPLE 2

The procedure described in Example 1 was repeated except that 5.8 parts of the dyestuff prepared by coupling a diazo solution prepared from p-chloro-o-nitroaniline and acetoacetanilide-4-sulphonic acid were used in place of the dyestuff prepared from acetoacet-o-chlor anilide and aniline-2,5-disulphonic acid. The pigment composition produced was found to have the same advantages over untreated pigment as did the pigment in Example 1.

EXAMPLE 3

A diazo solution prepared from 99.8 parts of m-nitro-p-toluidine was run into a slurry of 118 parts of aceto-acetanilide and 10.0 parts of the dyestuff prepared by coupling diazotised aniline-2,5-disulphonic acid with acetoacetanilide. The pH of coupling was controlled at 4.5 to 5.0.

After coupling, the slurry was heated to 70°, the pigment composition filtered off, washed free of soluble salts and dried at 50–55° C.

When dispersed in a decorative paint system at elevated temperature of 70° C., using a high speed stirrer-dissolver, the pigment composition showed no loss in colour strength when compared with a dispersion carefully prepared at low temperature.

A pigment prepared in an exactly similar manner except that the dyestuff was omitted showed a loss of 10% in colour strength under similar conditions and also gave a paint of much poorer flow properties.

EXAMPLE 4

The procedure described in Example 3 was repeated, except that 10 parts of the dyestuff prepared by coupling diazotised m-nitro-sulphanilic acid and acetoacetanilide were used instead of the dyestuff used in Example 3. The pigment composition produced was found to have the same advantages over untreated pigment as did the pigment composition prepared in Example 3.

EXAMPLE 5

The procedure described in Example 3 was repeated except that 10 parts of the dyestuff prepared by coupling diazotised m-nitro-p-toluidine and acetoacetnilide-4-sulphonic acid were used instead of the dyestuff used in Example 3. The pigment composition produced was found to have the same advantages over untreated pigment as did the pigment composition prepared in Example 3.

EXAMPLE 6

The procedure described in Example 3 was repeated with the additional feature that 12 parts of Rosin Amine D dissolved in 3 parts acetic acid/50 parts water were added to the pigment/dyestuff slurry before the heating stage.

The pigment composition was found to be more readily dispersible in paint media than the composition prepared in Example 3, while retaining the excellent colour strength and heat stability of that composition.

EXAMPLE 7

The procedure described in Example 3 was repeated with the additional feature that 45.4 parts of Beckacite 1624 resin dissolved in 5.6 parts of sodium hydroxide in 800 parts of water were added to the pigment/dyestuff slurry at pH 8.5 before the heating stage. The slurry was then raised to 70° C. over 60 minutes. Dilute acetic acid was added over 10 minutes until the pH of the slurry dropped to 5.0. The slurry was then filtered, and the pigment composition obtained, washed with water and dried at 50° C.

The pigment composition had similar excellent properties to the pigment composition prepared in Example 6.

EXAMPLE 8

1800 parts of a diazo solution prepared from 58.0 parts of m-nitro-p-toluidine and 1000 parts of water containing 57.8 parts of the sodium salt of β-naphthol were run simultaneously into a sodium acetate buffered solution of 8.2 parts of the dyestuff formed by coupling diazotised aniline 2,5-disulphonic acid with β-naphthol in 800 parts of water.

After the coupling was complete, the slurry at a final pH of 5.0 was heated to 60° C., and the pigment composition then filtered off, washed free of soluble salts and dried at 50–55° C. The product had a purer brighter hue and exhibited superior glass and flow properties to the pigment prepared in the same manner but without the dyestuff.

EXAMPLE 9

103 parts of Naphthol AS-D

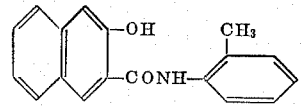

were dissolved in 28.8 parts of caustic soda and 11.0 parts of Turkey Red Oil, in 1000 parts of water and the Naphthol AS-D reprecipitated by the addition of 24.0 parts of glacial acetic acid and 27.8 parts of hydrochloric acid in 1000 parts of water. To this slurry, in a suitable coupling vessel were added 8.0 parts of the dyestuff formed by coupling diazotised aniline 2.5-disulphonic acid with Naphthol AS-D in 800 parts of water.

1,000 parts of a diazo solution prepared from 54.3 parts of p-nitro-o-toluidine were then run into the vessel at 40° C. over the course of 1½ hours. The pH was then adjusted to 6.0–6.5, the slurry filtered, and the pigment composition washed free of soluble salts and dried at 50–55° C.

This pigment composition showed superior gloss and better flow properties when dispersed in decorative paint media than did pigment prepared without the incorporation of sulphonated dyestuff.

EXAMPLE 10

A diazo solution prepared from 99.8 parts of m-nitro-p-toluidine was coupled with 109.2 parts of acetoacetanilide and 9.0 parts of acetoacetortho-toluidide in the presence of 10.0 parts of a dyestuff prepared by coupling diazotised 2-amino-5-methyl-benzene sulphonic acid with acetoacetanilide. The pH of coupling was controlled at 4.5–5.0. After coupling, the slurry was heated to 70° C., the pigment composition filtered off, washed free of soluble salts and dried at 50–55° C.

When dispersed in decorative paint media, this pigment composition had higher tinctorial strength, better gloss and superior flow properties than did a pigment prepared in a similar manner, but without the incorporation of the sulphonated dyestuff.

EXAMPLE 11

The procedure described in Example 10 was repeated except that 10 parts of the dyestuff prepared by coupling diazotised 2-naphthylamine-1-sulphonic acid with acetoacetanilide was used instead of the dyestuff used in that example. The pigment composition produced was found to have the same advantages over untreated pigment as did the pigment composition prepared in Example 10.

EXAMPLE 12

The procedure described in Example 10 was repeated except that 10 parts of the dyestuff prepared by coupling diazotised 2-naphthylamine 6,8-disulphonic acid with acetoacetanilide was used instead of the dyestuff used in that example. The pigment composition produced was found to have the same advantages over untreated pigment as did the pigment composition prepared in Example 10.

EXAMPLE 13

A diazo solution made from 45.3 parts p-nitro aniline was coupled with 59.0 parts acetoacetanilide in the presence of 5.2 parts of the dyestuff prepared by coupling diazotised aniline 2,5-disulphonic acid with acetoacetanilide. The pH of the coupling was controlled at 4.8–5.0. After coupling, the slurry was heated to 70° C., the pigment composition filtered off, washed free of soluble salts and dried at 50–55° C.

When dispersed in decorative paint media the pigment composition showed superior flow properties to a pigment prepared in a similar manner omitting only the incorporation of sulphonated dyestuff.

EXAMPLE 14

An aqueous slurry of yellow pigment was obtained by coupling a diazo solution prepared in the normal manner from 16.80 parts of 5-nitro-2-amino anisole and an aqueous slurry of 21.00 parts of acetoacet-2-anisidide using sodium acetate as a buffering agent.

To the slurry was added 0.96 part of the sulphonated azo dyestuff formed by coupling o-nitroaniline-p-sulphonic acid and acetoacet-2-chloranilide; the mixture was then heated to the boil and boiled for 30 minutes. The pigment composition was isolated by filtration, washed free of soluble impurities, and dried at 50° C.

When this pigment composition was incorporated in a lithographic varnish it showed greater colour strength, greater transparency, and improved flow properties than did a pigment made in an exactly similar manner but without incorporation of the sulphonated dyestuff.

The dyestuff formed by coupling o-nitro-p-sulphonic acid and acetoacet-2-chloranilide dyestuff can be replaced by other sulphonated dyestuffs, such as those formed by coupling benzidine - 2,2′ - disulphonic acid and acetoacetanilide and benzidine-2,2′-disulphonic acid and acetoacet-2,4-xylidide with equally effective results.

EXAMPLE 15

A diazo solution was prepared in the normal manner from 164.0 parts of 4-chloro-2-nitroaniline.

A coupling solution (1) was prepared containing 13.6 parts acetoacet - 2 - anisidide and 3.2 parts sodium hydroxide.

A coupling solution (2) was prepared containing 188.0 parts acetoacet-2-chloranilide and 43.2 parts sodium hydroxide.

The diazo solution was added simultaneously with coupling solution (1) to a coupling vessel containing 4.0 parts acetic acid and 35.4 parts sodium acetate. When coupling solution (1) had been used up coupling was continued using coupling solution (2) until coupling of the diazo was complete. 2.2 parts acetoacet-2-chloranilide were then added and the pH was adjusted to 5.0 with 10% sodium hydroxide solution. The slurry was heated to 95° C. for 30 minutes then cooled to 70° C. A diazo suspension prepared in the normal manner from 2.25 parts 2-nitroaniline-4-sulphonic acid was then added followed by a solution containing 16.0 parts Rosin Amine D and 3.3 parts acetic acid. After stirring for 30 minutes at 70° C. the pigment composition was filtered off, washed free of water-soluble impurities, and dried at 50° C.

This pigment composition showed no loss of colour strength when dispersed in a long soya oil-modified alkyd decorative paint at 80° C. on a high-speed stirrer-dissolver when compared with a dispersion carefully prepared at low temperature. A pigment prepared in an exactly similar manner but omitting the incorporation of the azo dyestuff o-nitroaniline-p-sulphonic acid coupled to acetoacet-o-chloranilide showed a loss of 30% in colour strength and gave a paint of much poorer flow properties.

EXAMPLE 16

An aqueous slurry of arylamide yellow 10 G pigment was prepared by coupling a diazo solution prepared from 164.0 parts 4-chloro-2-nitroaniline with 13.6 parts acetoacet-2-anisidide and 188.0 parts acetoacet-2-chloranilide as in Example 15. The pH of the slurry was adjusted to 5.0 with 10% sodium hydroxide solution and an aqueous solution of 7.5 parts of the sulphonated azo dyestuff formed by coupling benzidine-2,2′-disulphonic acid and acetoacetanilide, was added. A solution containing 16.0 parts Rosin Amine D and 3.3 parts acetic acid was then added and the slurry was then heated to 70° C. The pigment composition was filtered off, washed free of water-soluble impurities, and dried at 55° C.

The pigment composition showed similar advantages in decorative paint media over untreated pigment to the pigment compositions produced in Example 15.

EXAMPLE 17

The procedure described in Example 15 was repeated except that the sulphonated azo dyestuff used was 18.3 parts of 2-nitro-aniline-4-sulphonic acid coupled with acetoacetanilide-4-sulphonic acid.

The pigment composition produced showed the same advantages in decorative paint media as did the pigment composition produced in Example 15.

EXAMPLE 18

The procedure described in Example 3 was repeated except that, as dyestuff, there was used 10 parts of the dyestuff obtained by coupling diazoanthranilic acid and acetoacetanilide-4-sulphonic acid and not diazo aniline 2,5-disulphonic acid coupled to acetoacetanilide.

This pigment composition had superior flow properties in decorative paint media to pigment prepared without incorporation of the sulphonated dyestuff.

EXAMPLE 19

(i) A diazo suspension was prepared from 174 parts of 3-nitro-4-amino-toluene in 3000 parts of water at 0° C.

(ii) A diazo solution was prepared from 15.0 parts of aniline 2,5 disulphonic acid in 500 parts of water at 0° C.

Diazo components (i) and (ii) were then mixed.

(iii) In a coupling jar a solution of 91.5 parts of 2-naphthol in 26.1 parts of sodium hydroxide at 60° C. was prepared with 1250 parts water. This was diluted with water to 1750 parts and thereby cooled to 10° C.

The mixed diazo components were run in until 1900 parts had been added. 91.5 parts of 2-naphthol in 26.1 parts of sodium hydroxide and 1750 parts of water at 10° C. were added. The remaining diazo component was then slowly added.

The slurry was split into three parts.

To part A was added 5% by weight of cetyl alcohol and the slurry was heated to 60° C., held for 40 minutes at 60° C., and the pigment composition then filtered off, washed to remove water-soluble impurities and dried at 50° C.

To part B was added 5% by weight of the cetyl alcohol condensed with 25 moles of ethylene oxide sold under the trademark Lubrol W and the slurry was then treated as was part A.

Part C of the slurry was heated to 60° C., held at 60° C. for 80 minutes and then finished as was part A.

The above coupling and treatments were repeated except that the diazo aniline 2:5 disulphonic acid was omitted and the quantity of 2-naphthol figure reduced accordingly.

The pigment compositions prepared according to the invention showed greater transparency and higher tinctorial strength than did the pigments prepared without dyestuff.

EXAMPLE 20

(i) Diazo 2:4 dichloroaniline was prepared from 14.0 parts of 2:4 dichloroaniline in the usual manner.

(ii) Diazo aniline 2:5 disulphonic acid was prepared from 1.0 parts of aniline 2:5 disulphonic acid in the usual manner.

The two diazo solutions were mixed.

18.2 parts of Naphthol AS-G (the bisacetoacet derivative of o-tolidine) were dissolved in 13.4 parts of caustic soda and 200 parts of water at 50° C. Dilute acetic acid was added to the solution until the pH was below 7.0. The mixed diazo solution was added over 20 minutes, the pH being kept above 4.0 with small additions of 10% caustic soda solution.

The slurry was heated to 50° C. and held for 30 minutes until no excess of diazo was present. The slurry was heated to the boil and boiled for ½ hour; the pigment composition was isolated by filtering, washing free of water-soluble impurities and drying at 50° C.

This pigment composition had better gloss and transparency properties in letterpress ink than did a pigment prepared with the omission of the aniline disulphonic acid.

EXAMPLE 21

3-nitro-4-amino-toluene (58 parts) was pasted with concentrated hydrochloric acid (84.7 parts) and water (100 parts) for 30 minutes at room temperature. Ice was then added until the temperature fell below 0° and diazotisation was effected with sodium nitrite (27.2 parts) over 4 hours maintaining the temperature at 0 to —2° by the addition of further ice. On completion of the diazotisation the solution was treated with activated charcoal (2 parts) and filter aid (5 parts) filtered and then made to 1500 parts at 0° with water and ice. The solution was then buffered by the addition of sodium acetate (27.5 parts).

A coupling component solution was then prepared by dissolving 2-naphthol (54.9 parts) and 2-naphthol-6-sulphonic acid (4.5 parts) in 1000 parts of water containing sodium hydroxide (24.8 parts) at 60°. The volume of the solution was then adjusted to 1500 parts at 10° by the addition of ice and water.

Coupling was then carried out by running the diazo solution into the coupling component solution over 1 hour at 10° so that the final pH fell to about 5.0 and no excess of diazo component could be detected. The pigment slurry was then heated to 60°, and the pigment filtered off, washed, and dried at 55°.

The resulting pigment composition when tested in litho ink varnish was substantially stronger, brighter and yellower and more transparent than a pigment prepared in a similar manner but replacing the 2-naphthol-6-sulphonic acid by 2-naphthol (2.9 parts).

EXAMPLE 22

The product described on Example 21 was repeated except that the 2-naphthol-6-sulphonic acid was replaced by 6.1 parts 2-naphthol-3,6-disulphonic acid. The pigment composition prepared was tested in litho ink varnish and was stronger, brighter, yellower and more transparent than a pigment prepared in a similar manner but replacing the 2-naphthol-3,6-disulphonic acid by 2-naphthol.

EXAMPLE 23

A pigment slurry was prepared as in Example 21. After coupling the amine derivative of wood rosin sold under the trademark Rosin Amine D (5.6 parts) was added as a solution in 10% acetic acid (250 parts). The slurry was then heated to 60°; the pigment was filtered off, washed and dried at 55° and found to have the advantages shown by the pigment in Example 21 as well as being transparent and brighter in shade.

EXAMPLE 24

The procedure described in Example 20 was repeated except that the 18.2 parts of Naphthol AS-G were replaced by 13.4 parts of bisacetoacet derivative of p-phenylene diamine.

The pigment composition was found to have superior transparency and gloss when compared with a pigment prepared without dyestuff.

We claim:

1. A process in which an arylamide yellow pigment composition is produced which comprises coupling a diazotised pigment aniline or a diazotised substituted pigment aniline with a pigment acetoacetaryl amide coupling agent and incorporating in the pigment a water-soluble azo dyestuff and an aliphatic amine or amine oxide.

2. A process in which an arylamide yellow pigment composition is produced which comprises coupling a diazotised pigment aniline or a diazotised substituted pigment aniline with a pigment acetoacetaryl amide coupling agent and incorporating in the pigment a water-soluble azo arylamide dyestuff and an aliphatic amine or amine oxide.

3. A process in which a β-naphthol red or arylamide red pigment composition is produced which comprises coupling a diazotised pigment aniline or a diazotised substituted pigment aniline with a pigment β-naphthol or with a substituted pigment β-naphthol or with a pigment 2-hydroxynaphthalene-3-carboxylic acid arylamide coupling agent, and incorporating in the pigment a water-soluble azo dyestuff and an aliphatic amine or amine oxide.

4. A process according to claim 2 in which there is used in the coupling a stoichiometric excess of the pigment coupling agent over the diazotised pigment aniline and a minor proportion of a diazotised aniline bearing water solubilising groups is added to the diazotised pigment aniline before the coupling, or to a portion of the pigment coupling agent before the coupling or to the reaction mixture during or after the coupling.

5. A process according to claim 2 in which a water-soluble azo dyestuff is added to the diazotised pigment aniline before the coupling or to a portion of the pigment coupling agent before the coupling or to the reaction mixture during or after the coupling.

6. A process according to claim 2 in which a water-soluble azo dyestuff is added to a previously prepared pigment.

7. A process according to claim 2 in which the coupling of the pigment is conducted in a solution of a water-soluble azo dyestuff.

8. A process according to claim 2 in which the water-soluble azo arylamide dyestuff is rendered insoluble in situ in the composition.

9. A process according to claim 1 in which the amine or amine oxide contains from 8 to 20 carbon atoms.

10. A process according to claim 8 in which there is used from 0.1 to 35% by weight of amine or amine oxide calculated on the weight of pigment plus dyestuff.

11. A process according to claim 2 in which the pigment composition is subjected to a solvent treatment.

12. A process according to claim 2 in which the pigment composition is treated with a non-ionic surfactant.

13. A process according to claim 2 in which the pigment composition is treated with rosin, a rosin derivative, or other resin.

14. A process according to claim 2 in which the amine or amine oxide contains 8 to 20 carbon atoms.

15. A process according to claim 3 in which the amine or amine oxide contains 8 to 20 carbon atoms.

16. A process according to claim 1 in which the amine or amine oxide is present in amounts of 0.1 to 35% by weight calculated on the weight of the pigment plus dyestuff.

17. A process according to claim 3 in which the amine or amine oxide is present in amounts of 0.1 to 35% by weight calculated on the weight of the pigment plus dyestuff.

References Cited
UNITED STATES PATENTS

| | | | |
|---|---|---|---|
| 3,446,641 | 5/1969 | Mitchell et al. | 106—288 Q |
| 3,655,641 | 4/1972 | Hamilton | 106—288 Q |
| 3,532,520 | 10/1970 | Mitchell et al. | 106—288 Q |
| 3,529,984 | 9/1970 | Bendel et al. | 106—288 Q |
| 2,309,982 | 2/1943 | Reynolds et al. | 106—308 M |

DELBERT E. GANTZ, Primary Examiner

S. L. BERGER, Assistant Examiner

U.S. Cl. X.R.

106—288 Q